United States Patent
Lee et al.

(10) Patent No.: US 8,290,370 B2
(45) Date of Patent: Oct. 16, 2012

(54) WAVELENGTH DIVISION MULTIPLEXING PASSIVE OPTICAL NETWORK FOR PROVIDING BOTH OF BROADCASTING SERVICE AND COMMUNICATION SERVICE AND CENTRAL OFFICE USED THEREOF

(75) Inventors: Chang-Hee Lee, Daejeon (KR); Jung-Hyung Moon, Pusan (KR); Ki-Man Choi, Daegu (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 714 days.

(21) Appl. No.: 11/992,243

(22) PCT Filed: Sep. 19, 2006

(86) PCT No.: PCT/KR2006/003722
§ 371 (c)(1),
(2), (4) Date: Mar. 16, 2009

(87) PCT Pub. No.: WO2007/035035
PCT Pub. Date: Mar. 29, 2007

(65) Prior Publication Data
US 2009/0185807 A1    Jul. 23, 2009

(30) Foreign Application Priority Data
Sep. 20, 2005 (KR) .......... 10-2005-0087392

(51) Int. Cl.
*H04J 14/00* (2006.01)
(52) U.S. Cl. ............... 398/72; 398/71; 398/69; 398/68

(58) Field of Classification Search ............. 398/72, 398/71, 69, 68
See application file for complete search history.

(56) References Cited

U.S. PATENT DOCUMENTS

| | | |
|---|---|---|
| 4,341,438 A | 7/1982 | Seki et al. |
| 4,563,087 A | 1/1986 | Bourbin et al. |
| 4,912,526 A | 3/1990 | Iwaoka et al. |
| 4,947,134 A | 8/1990 | Olsson |
| 5,064,263 A | 11/1991 | Stein |
| 5,117,303 A | 5/1992 | Desurvire et al. |
| 5,202,780 A | 4/1993 | Fussanger |
| 5,221,983 A | 6/1993 | Wagner |
| 5,251,001 A | 10/1993 | Dave et al. |
| 5,251,054 A | 10/1993 | Lynn |

(Continued)

FOREIGN PATENT DOCUMENTS

EP   0 060 033 A   9/1982

(Continued)

OTHER PUBLICATIONS

McMahon, Donald H., et al. "Echelon grating multiplexers for hierarchically multiplexed fiber-optic communication networks," Applied Optics, vol. 26, No. 11, pp. 2188-2196 (Jun. 1, 1987).

(Continued)

*Primary Examiner* — Kinam Park
(74) *Attorney, Agent, or Firm* — Blakely, Sokoloff, Taylor & Zafman LLP

(57) ABSTRACT

Disclosed is a wavelength division multiplexing passive optical network for simultaneously providing a broadcasting service and a data service by employing a broadband light source, which uses mutually injected Fabry-Perot laser diodes, as well as a central office used for the same.

6 Claims, 7 Drawing Sheets

U.S. PATENT DOCUMENTS

| | | |
|---|---|---|
| 5,276,543 A | 1/1994 | Olshansky |
| 5,307,366 A | 4/1994 | Auffret et al. |
| 5,321,541 A | 6/1994 | Cohen |
| 5,347,525 A | 9/1994 | Faris |
| 5,379,309 A | 1/1995 | Logan, Jr. et al. |
| 5,408,349 A | 4/1995 | Tsushima et al. |
| 5,412,673 A | 5/1995 | Caprara et al. |
| 5,418,183 A | 5/1995 | Joyner et al. |
| 5,434,662 A | 7/1995 | Rockwell et al. |
| 5,436,760 A | 7/1995 | Nakabayashi |
| 5,440,417 A | 8/1995 | Chung et al. |
| 5,491,573 A | 2/1996 | Shipley |
| 5,550,666 A | 8/1996 | Zirngibl |
| 5,589,970 A | 12/1996 | Lyu et al. |
| 5,600,471 A | 2/1997 | Hirohashi et al. |
| 5,625,478 A | 4/1997 | Doerr et al. |
| 5,646,774 A | 7/1997 | Takara et al. |
| 5,661,585 A | 8/1997 | Feldman et al. |
| 5,694,234 A | 12/1997 | Darcie et al. |
| 5,773,345 A | 6/1998 | Ota |
| 5,793,512 A | 8/1998 | Ryu |
| 5,796,502 A | 8/1998 | Haller, Jr. |
| 5,812,572 A | 9/1998 | King et al. |
| 5,835,517 A | 11/1998 | Jayaraman et al. |
| 5,841,557 A | 11/1998 | Otsuka et al. |
| 5,864,414 A | 1/1999 | Barnsley et al. |
| 5,880,865 A | 3/1999 | Lu et al. |
| 5,894,247 A | 4/1999 | Yoshida et al. |
| 5,907,417 A | 5/1999 | Darcie et al. |
| 5,920,414 A | 7/1999 | Miyachi et al. |
| RE36,471 E | 12/1999 | Cohen |
| 6,034,799 A | 3/2000 | Hansen |
| 6,081,355 A | 6/2000 | Sharma et al. |
| 6,097,523 A | 8/2000 | Boot |
| 6,120,190 A | 9/2000 | Mirman et al. |
| 6,134,037 A | 10/2000 | Shabeer et al. |
| 6,134,250 A | 10/2000 | Koren et al. |
| 6,137,611 A | 10/2000 | Boivin et al. |
| 6,178,001 B1 | 1/2001 | Kim |
| 6,192,170 B1 | 2/2001 | Komatsu |
| 6,304,350 B1 | 10/2001 | Doerr et al. |
| 6,307,668 B1 | 10/2001 | Bastien et al. |
| 6,310,720 B1 | 10/2001 | Walker et al. |
| 6,323,994 B1 | 11/2001 | Li et al. |
| 6,437,907 B1 | 8/2002 | Yoon et al. |
| 6,469,649 B1 | 10/2002 | Helkey et al. |
| 6,470,036 B1 | 10/2002 | Bailey et al. |
| 6,498,871 B1 | 12/2002 | Kuboki |
| 6,597,482 B1 | 7/2003 | Chung et al. |
| 6,600,760 B1 | 7/2003 | Green et al. |
| 6,603,599 B1 | 8/2003 | Wang et al. |
| 6,650,840 B2 | 11/2003 | Feldman |
| 6,654,401 B2 | 11/2003 | Cavalheiro Vieira et al. |
| 6,674,969 B1 | 1/2004 | Ogusu |
| 6,711,313 B2 | 3/2004 | Takiguchi et al. |
| 6,771,358 B1 | 8/2004 | Shigehara et al. |
| 6,868,200 B2 | 3/2005 | Kimotsuki et al. |
| 6,868,236 B2 | 3/2005 | Wiltsey et al. |
| 6,888,856 B2 | 5/2005 | Green et al. |
| 6,941,074 B2 | 9/2005 | Nakamura et al. |
| 7,006,719 B2 | 2/2006 | Joyner et al. |
| 7,075,712 B2 | 7/2006 | Kinoshita et al. |
| 7,092,595 B2 | 8/2006 | Sorin et al. |
| 7,106,974 B2 | 9/2006 | Lee et al. |
| 7,171,123 B2 | 1/2007 | Lee et al. |
| 7,254,344 B2 | 8/2007 | Kim et al. |
| 7,313,157 B2 | 12/2007 | Sorin et al. |
| 7,327,957 B2 | 2/2008 | Lee et al. |
| 7,349,631 B2 | 3/2008 | Lee et al. |
| 7,403,718 B2 | 7/2008 | Matthews et al. |
| 7,415,205 B2 | 8/2008 | Shin et al. |
| 7,593,444 B2 | 9/2009 | Sorin et al. |
| 7,613,398 B2 | 11/2009 | Lee et al. |
| 7,627,246 B2 | 12/2009 | Sorin et al. |
| 2001/0004290 A1 | 6/2001 | Lee et al. |
| 2001/0013962 A1 | 8/2001 | Li et al. |
| 2001/0046364 A1 | 11/2001 | Ajima et al. |
| 2002/0039465 A1 | 4/2002 | Skinner |
| 2002/0067526 A1 | 6/2002 | Park et al. |
| 2002/0068859 A1 | 6/2002 | Knopp |
| 2002/0071173 A1 | 6/2002 | Lee et al. |
| 2002/0097768 A1 | 7/2002 | Thornton |
| 2002/0126345 A1 | 9/2002 | Chapman et al. |
| 2002/0196491 A1 | 12/2002 | Deng et al. |
| 2003/0007207 A1 | 1/2003 | Healy et al. |
| 2003/0039010 A1 | 2/2003 | Akimoto et al. |
| 2003/0058500 A1 | 3/2003 | Sugawara |
| 2003/0076560 A1 | 4/2003 | Pratt et al. |
| 2003/0095736 A1 | 5/2003 | Kish, Jr. et al. |
| 2003/0128917 A1 | 7/2003 | Turpin et al. |
| 2003/0142978 A1 | 7/2003 | Lee et al. |
| 2003/0165006 A1 | 9/2003 | Stephens et al. |
| 2003/0205706 A1 | 11/2003 | Lin et al. |
| 2003/0206740 A1 | 11/2003 | Lee et al. |
| 2003/0223672 A1 | 12/2003 | Joyner et al. |
| 2003/0223761 A1 | 12/2003 | Brown et al. |
| 2004/0033004 A1 | 2/2004 | Welch et al. |
| 2004/0033076 A1 | 2/2004 | Song et al. |
| 2004/0067059 A1 | 4/2004 | Song et al. |
| 2004/0131358 A1* | 7/2004 | Jung et al. ............... 398/72 |
| 2004/0136716 A1* | 7/2004 | Jung et al. ............... 398/85 |
| 2004/0175188 A1 | 9/2004 | Bellemare et al. |
| 2004/0184805 A1 | 9/2004 | Shin et al. |
| 2004/0184806 A1 | 9/2004 | Lee et al. |
| 2004/0208208 A1 | 10/2004 | Shin et al. |
| 2004/0264400 A1 | 12/2004 | Lee et al. |
| 2005/0135449 A1 | 6/2005 | Sorin et al. |
| 2005/0147412 A1 | 7/2005 | Park et al. |
| 2005/0152696 A1 | 7/2005 | Shin et al. |
| 2005/0163503 A1 | 7/2005 | Lee et al. |
| 2005/0259989 A1 | 11/2005 | Sorin et al. |
| 2005/0286895 A1 | 12/2005 | Lee et al. |
| 2006/0002706 A1 | 1/2006 | Lee et al. |
| 2006/0045542 A1 | 3/2006 | Chu et al. |
| 2006/0093360 A1 | 5/2006 | Kim et al. |
| 2006/0262324 A1 | 11/2006 | Hays et al. |
| 2006/0263090 A1 | 11/2006 | Lee et al. |
| 2007/0014509 A1 | 1/2007 | Kish, Jr. et al. |
| 2007/0081823 A1 | 4/2007 | Lee et al. |
| 2007/0274729 A1 | 11/2007 | Lee et al. |
| 2008/0137698 A1 | 6/2008 | Sorin et al. |
| 2008/0232805 A1 | 9/2008 | Lee et al. |
| 2010/0221008 A1 | 9/2010 | Lee et al. |

FOREIGN PATENT DOCUMENTS

| | | |
|---|---|---|
| EP | 0 607 029 A | 7/1994 |
| EP | 0 688 114 A | 12/1995 |
| EP | 0 844 706 A2 | 5/1998 |
| EP | 0 844 706 A3 | 2/1999 |
| EP | 0 972 367 A | 1/2000 |
| EP | 0 991 217 A2 | 4/2000 |
| EP | 1 024 541 A | 8/2000 |
| EP | 1 089 098 A | 4/2001 |
| EP | 1124296 | 8/2001 |
| EP | 1 195 867 A1 | 4/2002 |
| EP | 1 388 963 A2 | 2/2004 |
| EP | 1468515 | 10/2004 |
| GB | 2 122 371 A | 1/1984 |
| JP | 61-114624 | 6/1986 |
| JP | 02-261236 | 10/1990 |
| JP | 06-252860 | 9/1994 |
| JP | 8-163097 | 6/1996 |
| JP | 09-233052 | 9/1997 |
| JP | 10-23478 | 1/1998 |
| JP | 11-211924 | 8/1999 |
| JP | 2000-174397 | 6/2000 |
| JP | 2000-196536 | 7/2000 |
| JP | 2000-292636 | 10/2000 |
| JP | 2001-127377 | 5/2001 |
| JP | 2001-188140 | 7/2001 |
| JP | 2001-203643 | 7/2001 |
| JP | 2001-230733 | 8/2001 |
| JP | 2001-257658 | 9/2001 |
| JP | 2001-356377 | 12/2001 |
| JP | 2002-141927 | 5/2002 |
| JP | 2002-270949 | 9/2002 |
| JP | 2002-374207 | 12/2002 |

| | | |
|---|---|---|
| JP | 2003-14963 | 1/2003 |
| JP | 2003-17798 | 1/2003 |
| JP | 2003-69502 | 3/2003 |
| JP | 2003-124893 | 4/2003 |
| JP | 2003-124911 | 4/2003 |
| JP | 2003-134058 | 5/2003 |
| JP | 2004-159328 | 3/2004 |
| KR | 10-2004-0025304 A | 2/2000 |
| KR | 00-33946 | 6/2000 |
| KR | 10-2000-0033946 A | 6/2000 |
| KR | 00-39036 | 7/2000 |
| KR | 10-2001-0063062 A | 7/2001 |
| KR | 01-93921 | 10/2001 |
| KR | 10-2002-0003318 | 1/2002 |
| KR | 2002-0005326 | 1/2002 |
| KR | 0325687 | 2/2002 |
| KR | 10-2003-0063085 A | 7/2003 |
| KR | 10-2003-0065632 A | 8/2003 |
| KR | 10-2003-0086223 A | 11/2003 |
| KR | 10-2000-009290 A | 2/2004 |
| KR | 10-2004-0023305 A | 3/2004 |
| KR | 10-2004-0056828 A | 7/2004 |
| KR | 0454887 | 10/2004 |
| KR | 10-2004-0103085 A | 12/2004 |
| KR | 0496710 | 6/2005 |
| KR | 10-0515259 | 9/2005 |
| KR | 10-2006-0042486 A | 5/2006 |
| KR | 10-2007-0021122 | 2/2007 |
| KR | 10-0680815 | 2/2007 |
| WO | WO 97/49248 A1 | 12/1997 |
| WO | WO 98/32196 | 7/1998 |
| WO | WO 98/45974 A2 | 10/1998 |
| WO | WO 99/37002 A1 | 7/1999 |
| WO | WO 99/59010 A1 | 11/1999 |
| WO | WO 00/05788 | 2/2000 |
| WO | WO 00/10271 | 2/2000 |
| WO | WO 03/032547 A2 | 4/2003 |
| WO | WO 03/063401 A2 | 7/2003 |
| WO | WO 03/065621 A1 | 8/2003 |
| WO | WO 03/102659 | 12/2003 |
| WO | WO 03/107057 A1 | 12/2003 |
| WO | WO 2004/028047 A1 | 4/2004 |
| WO | WO 2004/034621 A2 | 4/2004 |
| WO | WO 2004/034621 A3 | 4/2004 |
| WO | WO 2004/047344 | 6/2004 |
| WO | WO 2004/059915 A1 | 7/2004 |
| WO | WO 2004/107628 A1 | 12/2004 |
| WO | WO 2005/069516 A1 | 7/2005 |
| WO | WO 2005/099148 A1 | 10/2005 |
| WO | WO 2006/005981 A1 | 1/2006 |
| WO | WO 2007/027042 A1 | 3/2007 |

OTHER PUBLICATIONS

Jung, et al., "Spectrum-Sliced Bidirectional WDM PON," Optical Fiber Communication Conference, vol. 2, pp. WJ6-2 to WJ6-4 (2000).
Zah, C., et al., "Amplifiers with Angled Facets, Fabrication and Performance of 1.5MUM GAINASP Traveling-Wave Laser," Electronics Letters, IEE Stevenage, GB, vol. 23, No. 19, Sep. 10, 1987, pp. 990-992, XP000710298, ISSN: 0013-5194.
Chang-Hasnain et al., "Integrated external cavity quantum well laser array using single epitaxial growth on a patterned substrate," Applied Physics Letters, vol. 56, No. 5, Jan. 1990.
Zirngibl, M., et al., "An 18-Channel Mulitfrequency Laser," IEEE Photonics Technology Letters, vol. 9, No. 7, Jul. 1996, pp. 870-872 (3 pages).
Zirngibl, M., et al., "Study of Spectal Slicing for Local Access Applications," IEEE Photonics Technology Letters, vol. 8, No. 5, pp. 721-723 (May 1996).
Woodward, S.L., et al., "A Spectrally Sliced PON Employing Fabry-Perot Lasers," IEEE Photonics Technology Letters, vol. 10, No. 9, pp. 1337-1339 (Sep. 1998).
Iwashita, Katsushi, et al., "Suppression of Mode Partition Noise by Laser Diode Light Injections," IEEE Journal of Quantum Electronics, vol. QE-18, No. 10, pp. 1669-1674 (Oct. 1982).
Feuer, M.D., et al., "Singe-Port Laser-Amplifier Modulators for Local Access,"IEEE Photonics Technology Letters, vol. 8, No. 9, pp. 1175-1177 (Sep. 1996).

Haruna, Masamitsu, et al., "Optical Waveguide Power Distributor and Multichannel Modulator and Demodulator," Piezo-Electricity and Acousto-optic, No. 4 of 1983, pp. 58-67, Apr. 1983.
Jinshan, Xie, "Application of Wavelength Division Multiplexing (WDM) Technology in Passive Optical Network," Development of Laser and Optoelectronics (Supplement), No. 9 of 1999, pp. 67-70, Sep. 1999.
Youlong, Yu, et al., "Study on a Novel High Power Broadband Light Source," Chinese Journal of Lasers, vol. A28, No. 1, pp. 71-73, Jan. 2001.
Yunfeng, Shen, et al., "The Research on Layering Structure and Network Management of Photonic Transport Networks," Journal of China Institute of Communications, vol. 19, No. 7, pp. 18-24, Jul. 1998.
Presby, H.M., et al., "Amplified integrated star couplers with zero loss," Photonics Technology Letters, IEEE vol. 3, Issue 8, Aug. 1991, pp. 724-726.
Shin, et al., "155 Mbit/s Transmission Using ASE-Injected Fabry-Perot Laser Diode in WDM-PON over 700C Temperature Rage," Electronics Letters, Sep. 4, 2003, vol. 39, No. 18, pp. 1331-1332.
Choi, K.M., "Broadband Light Source by Mutually Injected FP-LD's" OECC/COIN 2004, Jan. 1, 2004, pp. 882-884, XP009126452.
Jin, Xiaomin, et al., "Bandwidth enhancement of Fabry-Perot quantum-well lasers by injection-locking" Jun. 12, 2006, Solid-State Electronics, p. 1141-9.
Takachio, N., et al., "Wide Area Gigabit Access Network based on 12.5GHz Spaced 256 Channel Super-Dense WDM Technologies", Electronic Letters, vol. 35, No. 5, XP6016306, 2 pgs., (Mar. 1, 2001).
Baik, J., et al., "Wavelength Self-Managed Optical WDM Source Using Polarization-Multiplexed Fabry-Perot Laser Diodes", IEEE Photonics Technology Letters, vol. 16, No. 10, Oct. 2004.
Kikuchi, Kazuro "Effect of 1/f -Type FM Noise on Semiconductor-Laser Linewidth Residual in High-Power Limit", IEEE Journal of Quantum Electronics, vol. 25, No. 4, Apr. 1989, pp. 684-688.
Kurtz, Russell M., et al., "Mutual Injection Locking: A New Architecture for High-Power Solid-State Laser Arrays", May/Jun. 2005, IEEE Journal of Selected Topics in Quantum Electronics, vol. 11, No. 3, pp. 578-586.
Hyun Deok Kim, et al., "A Low-Cost WDM Source with an ASE Injected Fabry-Perot Semiconductor Laser," XP000968561, IEEE Photonics Technology Letters, vol. 12, No. 8, pp. 1067-1069 (Aug. 2000).
Robert D. Feldman, et al., "An Evaluation of Architectures Incorporating Wavelength Division Multiplexing for Broad-Band Fiber Access," Journal of Lightwave Technologies, vol. 16, No. 9, pp. 1546-1559 (Sep. 1998).
H. Takahashi, et al., "Transmission characteristics of arrayed-waveguide NxN wavelenth multiplexer," IEEE Photonic Technology Letters, vol. 13, No. 3, pp. 447-455 (Mar. 1995).
International Telecommunication Union (ITU), ITU-T, G.983.1. Series G: Transmission Systems and Media Digital Systems and Networks, Digital transmission systems—Digital sections and digital line system—Optical line systems for local and access networks, Broadband optical access systems based on Passive Optical Networks (PON) (Oct. 1998).
J. Heanue et al., "Widely Tunable Laser Module using DFB Array and MEMS Selection with Internal Wavelength Locker", OFC 2003/ vol. 1, pp. 82-83.
B. Pezeshki et al., "12 Element Multi-wavelength DFB Arrays for Widely Tunable Laser Modules", OFC 2002, pp. 711-712.
Jae-Sung Lee, "Signal-to-Noise Ratio Measurement of a 2.5-Gb/s Spectrum-Sliced Incoherent Light Channel," IEEE Photonics Technology Letters, vol. 9, No. 1, pp. 94-96 (Jan. 1997).
L.Y. Chan, et al., "Upstream traffic transmitter using injection-locked Fabry-Perot laser diode as modulator for WDM access networks," XP006017703, Electronic Letters, vol. 38, No. 1, pp. 43-45 (Jan. 3, 2002).
Dong Jae Shin, et al., "Hybrid WDM/TDM-PON with Wavelength-Selection-Free Transmitters," Journal of Lightwave Technology, vol. 23, No. 1, pp. 187-195 (Jan. 2005).
E. Wong, et al., "Low-cost WDM passive optical network with directly-modulated self-seeding reflective SOA," Electronics Letters, vol. 42, No. 5, 2 pages (Mar. 2, 2006).

Wai Hung, et al., "An Optical Network Unit for WDM Access Networks with Downstream DPSK and Upstream remodulated OOK Data Using Injection-Locked FP Laser," IEEE Photonics Technology Letters, vol. 15, No. 10, pp. 1476-1478 (Oct. 10, 2003).

Derek Mayweather, et al., "Wavelength Tracking of a Remote WDM Router in a Passive Optical Network," XP000624886, IEEE Photonics Technology Letters, vol. 8, No. 9, pp. 1238-1240 (Sep. 1, 1996).

Database WPI, Section E1, Week 200111, Derwent Publications ltd., London, GB, AN 2001-098850, XP002276043.

D.K. Jung, et al., "Wavelength-Division-Multiplexed Passive Optical Network Based on Sprectrum-Slicing Techniques," IEEE Photonics Technology Letters, vol. 10, No. 9, pp. 1334-1336 (Sep. 1998).

J.S. Lee, et al., "Sprectrum-Sliced Fiber Amplifier Light Source for Multichannel WDM Applications," IEEE Photonics Technology Letters, vol. 5, No. 12, pp. 1458-1461 (Dec. 1993).

P. Healey, et al., "Spectral Slicing WDM-PON Using Wavelength-Seeded Reflective SOAs," Electronics Letters, vol. 37, No. 19, pp. 1181-1182 (Sep. 13, 2001).

Qiao Yaojun, et al., "A New Scheme for WDM-Based Passive Optical Access Network," 4 pgs. (2000).

S.V. Kartalopoulos, Introduction to DWDM Technology: Data in a Rainbow, pp. 56-57 (2000).

K. Petermann, "Laser Diode Modulation and Noise," Noise Characteristics of Solitary Laser Diodes, Section 7.3.2 Mode partition noise pp. 163-166 (1991).

Tae-Won Oh, et al., "Broadband Light Source for Wavelength-Division Multiple Access Passive Optical Network," Dept. of Electrical Engineering, Korea Advanced Institute of Science and Technology and Novera Optics Korea, Inc., (2003).

D.D. Sampson, et al., "100mW Sprectrally-Uniform Broadband ASE Source for Sprectrum-Sliced WDM Systems," XP006001052, Electronics Letters, vol. 30, No. 19, pp. 1611-1612 (Sep. 15, 1994).

\* cited by examiner

FIG. 16
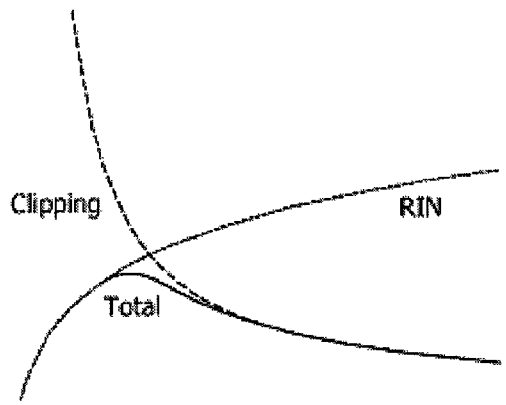
FIG. 17
@ BER = 10$^{-9}$
|  | Eb/No (dB) | R/W (bps/Hz) | SNR (dB) |
|---|---|---|---|
| OOK | 15.6 | 1 | 15.6 |
| BPSK | 12.6 | 1 | 12.6 |
| QPSK | 12.6 | 2 | 15.6 |
| 16QAM | 16.6 | 4 | 22.6 |
| 64QAM | 21.0 | 6 | 28.8 |
| 256QAM | 25.6 | 8 | 34.6 |
+1.4dB @ BER=10$^{-12}$
+2.4dB @ BER=10$^{-15}$
FIG. 18
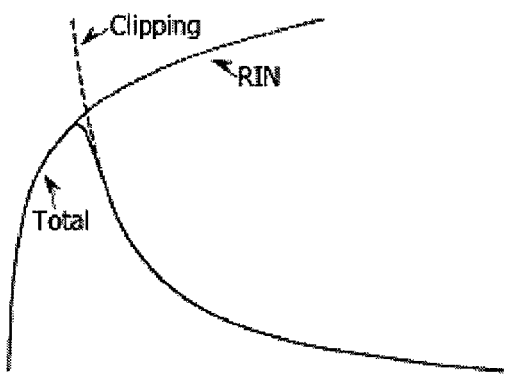

WAVELENGTH DIVISION MULTIPLEXING PASSIVE OPTICAL NETWORK FOR PROVIDING BOTH OF BROADCASTING SERVICE AND COMMUNICATION SERVICE AND CENTRAL OFFICE USED THEREOF

CROSS REFERENCE TO RELATED APPLICATION

This patent application is a U.S. National Phase application under 35 U.S.C. & 371 of International Application No. PCT/KR2006/003722, filed on 19 Sep. 2006, entitled WAVELENGTH DIVISION MULTIPLEXING PASSIVE OPTICAL NETWORK FOR PROVIDING BOTH OF BROADCASTING SERVICE AND COMMUNICATION SERVICE AND CENTRAL OFFICE USED THEREOF, which claims priority to South Korean application number 10-2005-0087392, filed 20 Sep. 2005.

TECHNICAL FIELD

The present invention relates to a wavelength division multiplexing passive optical network for combining a broadcasting service with a communication service, as well as a central office used for the same. More particularly, the present invention relates to a wavelength division multiplexing passive optical network for simultaneously providing a broadcasting service and a data service by employing a broadband light source (hereinafter, referred to as BLS), which uses mutually injected Fabry-Perot laser diodes (hereinafter, referred to as F-P LDs), as well as a central office used for the same.

BACKGROUND ART

In the case of currently used networks, as generally known in the art, networks for broadcasting services are separate from those for data services. Broadcasting services are provided via coaxial cables, satellites, or terrestrial waves. Data services are available via xDSL or cable modems, which are based on copper wires, so that Internet services can be provided at a rate of tens of kbps or a number of Mbps. Recently, extensive use of Internet and rapid replacement of conventional services, which have mainly been developed for voice and text communication, by video-oriented services have resulted in ever-increasing request for faster networks. This means that conventional networks need upgrade or replacement. However, it costs a large amount of money to install networks for broadcasting services separate from networks for data services, and furthermore, separate maintenance and management of networks are unfavorable from an economic point of view. In an attempt to solve these problems, much effort is being made to provide a combined system capable of providing both broadcasting and communication data services. Meanwhile, networks based on copper wires can hardly satisfy the demand for higher rate, due to their physical limitations.

Lately passive optical networks (hereinafter, referred to as PONs) based on optical fiber are drawing much attention. This is because PONs can provide both data and broadcasting services while satisfying the requests for faster networks and combination of broadcasting and data services. According to the implementation method, PONs are classified into TDM (Time Division Multiplexing)-PONs and WDM (Wavelength Division Multiplexing)-PONs. In terms of provision of broadcasting services, TDM-PONs have limitations regarding the number of subscribers and the transmission distance, because their optical splitters have serious losses. Amplifiers may be used to compensate for such limitations. However, when optical signals having a predetermined level or more of output power are inputted to optical fiber, the nonlinearity of the optical fiber increases noise components and results in a penalty. When it comes to data transmission, TDM-PONs have a fixed downstream transmission rate, which is shared by a number of subscribers. This means that, as the number of subscribers (i.e. branches) increases, the transmission rate for each subscriber is decreased. In addition, a complicated MAC (Media Access Control) protocol is necessary to solve problems of ranging related to the distance between subscribers. And other problems including implementation of burst-mode optical receivers, security based on the broadcasting mode must be solved. This increases the system complexity. Particularly, the splitting loss occurring in the optical splitters worsens the optical loss from the telephone office to the subscribers. This is a major obstacle to increase the transmission rate.

In contrast, WDM-PONs can guarantee transparency regarding the protocol and transmission rate, flexibility for accommodating various services, and excellent network expandability. In addition, the fact that each subscriber has point-to-point connection with the central office secures the quality of service and ensures a high level of security and privacy. As such, WDM-PONs are regarded as the ultimate optical networks due to the merit of accommodating services with various rates and modulation formats for respective subscribers. Consequently, it is increasingly requested to develop a WDM-PON for providing a combined service of broadcasting and communication.

FIG. 1 shows a first example of a WDM-PON adapted to simultaneously transmit broadcasting and communication services according to the prior art. Referring to FIG. 1, a central office (hereinafter, referred to as CO) 100 consists of a plurality of first optical transmitters 110a for providing a plurality of optical network terminals (hereinafter, referred to as ONTs) 500 with a downstream broadcasting service and a plurality of second optical transmitters 110b for providing a data service. The first and second optical transmitters 110a and 110b use different wavelengths. A WDM filter 130a multiplexes optical signals for broadcasting via the same channel and optical signals for data. An arrayed waveguide grating (hereinafter, referred to as AWG) 140 multiplexes optical signals of a plurality of channels. The optical signals are demultiplexed for respective channels as they pass through an optical fiber 200 and an AWG 310. Then, the demultiplexed optical signals are separated into optical signals for the broadcasting service and optical signals for the data service by an optical fiber 400 and a WDM filter 530. Finally, the optical signals are transmitted to first and second optical receivers 520a and 520b, respectively, and are converted into electrical signals.

In order to provide both broadcasting and data communication services, two downstream optical transmitters and two downstream optical receivers are necessary for each subscriber. This increases the price of the WDM-PON system and, as a result, the burden on subscribers.

FIG. 2 shows a second example of a WDM-PON adapted to simultaneously transmit broadcasting and communication services according to the prior art. Referring to FIG. 2, the optical transmitters (FIG. 1) for providing a broadcasting service are replaced with a BLS. The CO 100 consists of a plurality of optical transmitters 110c for providing a plurality of ONTs 500 with a downstream data service. Optical signals of a plurality of channels for a data service pass through a WDM filter 130b and an AWG 140 and are multiplexed. Then, the multiplexed optical signals are added to a BLS 160 for providing a broadcasting service via a WDM filter 180. In order to apply a broadcasting signal, the BLS is modulated through a direct or external modulation process.

FIG. 3 shows the spectra of a BLS before and after it passes through an AWG according to the prior art. Referring to FIG. 3 together with FIG. 2, a spectrum of the BLS 160 before it passes through the AWG 310 is labeled 600. After passing through the AWG 310, the spectrum 600 is divided into spectrums 610, 620, and 630. Particularly, the broad spectrum 600 of the BLS 160 is spectrally sliced according to the wavelength of an output port, which the AWG 310 passes. After the spectrum division, the spectrally sliced light is transmitted from each output port of the AWG 310 so that the broadcasting service is available to each subscriber. The procedure after the AWG 310 is the same as in the case of FIG. 1.

The BLS 160 shown in FIG. 2 may be a light source using amplified spontaneous emission light, such as LED (Light Emitting Source) or EDFA (Erbium Doped Fiber Amplifier). The LED does not have sufficient power, and the EDFA increases the budget. These light sources output incoherent light, and the resulting beating noise degrades the signal quality. This limits the number of broadcasting channels available for transmission. The noise depends on the filtered bandwidth. In the case of a Gaussian filter having a bandwidth of 50 GHz, its RIN (Relative Intensity Noise) is −108.8 dB/Hz. Furthermore, use of an external modulator allows polarization to pass in only one direction. As a result, the RIN is increased by 3 dB and becomes −105.8 dB/Hz.

The second example shown in FIG. 2 employs a single BLS so as to providing a broadcasting service. This is advantageous from an economic point of view. However, the light source has a high RIN value due to the beating noise. This reduces the number of channels available for transmission and makes it impossible to transmit signals in a format requiring a high SNR.

FIG. 4 shows a BLS depending on polarization using mutually injected F-P LDs according to the prior art. FIG. 5 shows a BLS not depending on polarization using mutually injected F-P LDs according to the prior art. FIG. 6 shows an output spectrum of a BLS using mutually injected F-P LDs according to the prior art. FIG. 7 shows noise characteristics of a BLS using mutually injected F-P LDs according to the prior art.

FIG. 7 shows the RIN of a mode of a BLS, which has been obtained by mutually injecting F-P LDs having anti-reflective coating. It is clear from the drawing that, except for the low-frequency domain, the RIN has a very low value of about −135 dB/Hz. Even if this is applied to a wavelength-locked F-P LD proposed by Registered Korean Patent No. 325, 687 (Feb. 8, 2002), entitled "WAVELENGTH DIVISION MULTIPLEXING LIGHT SOURCE FOR OPTICAL COMMUNICATION USING FABRY-FEROT LASER DIODE WAVELENGTH-LOCKED BY INJECTED INCOHERENT LIGHT," the noise characteristics are similar to those of the BLS using mutually injected F-P LDs.

DISCLOSURE OF THE INVENTION

Therefore, the present invention has been made in view of the above-mentioned problems, and it is an object of the present invention to provide a WDM-PON system capable of providing a broadcasting service via more channels in a data format requiring a high SNR by employing a BLS using mutually injected F-P LDs having low RIN characteristics.

It is another object of the present invention to provide an economical WDM-PON system capable of simultaneously providing a broadcasting service and a data service by employing a BLS using mutually injected inexpensive F-P LDs. It is another object of the present invention to provide a WDM-PON system capable of simultaneously providing a broadcasting service and a data service in a more economical manner by employing a BLS using mutually injected F-P LDs, which have been wavelength-locked.

According to an aspect of the present invention, as can be seen in FIG. 8, there is provided a central office used in a wavelength division multiplexing passive optical network so as to simultaneously provide a broadcasting service and a communication service, the central office including a plurality of downstream optical transmitters for outputting optical signals for providing a plurality of subscribers with a data service; a plurality of upstream optical receivers for receiving optical signals of upstream data from the subscribers and converting the optical signals into electrical signals; a wavelength division multiplexer/demultiplexer for multiplexing/demultiplexing the optical signals; a broadband light source for broadcasting signals, the broadband light source for outputting optical signals for providing the subscribers with a broadcasting service; and a modulator for optically modulating the broadband light source into broadcasting signals.

According to another aspect of the present invention, as can be seen in FIG. 12, there is provided a central office used in a wavelength division multiplexing passive optical network so as to simultaneously provide a broadcasting service and a communication service, the central office including a plurality of first downstream optical transmitters for outputting optical signals for providing a plurality of subscribers with a broadcasting service; a plurality of second downstream optical transmitters for outputting optical signals for providing a plurality of subscribers with a data service; a plurality of upstream optical receivers for receiving optical signals of upstream data from the subscribers and converting the optical signals into electrical signals; a wavelength division multiplexer/demultiplexer for multiplexing/demultiplexing the optical signals; a broadband light source for broadcasting signals, the broadband light source being spectrum-sliced by the wavelength division multiplexer/demultiplexer and injected into light sources for broadcasting signals; a broadband light source for downstream signals, the broadband light source being spectrum-sliced by the wavelength division multiplexer/demultiplexer and injected into light sources for downstream signals; and a broadband light source for upstream signals, the broadband light source being spectrum-sliced by the wavelength division multiplexer/demultiplexer and injected into light sources for upstream signals.

According to another aspect of the present invention, as can be seen in FIG. 13, there is provided a central office used in a wavelength division multiplexing passive optical network so as to simultaneously provide a broadcasting service and a communication service, the central office including a plurality of downstream optical transmitters for outputting optical signals for providing a plurality of subscribers with a broadcasting service and a data service; a plurality of upstream optical receivers for receiving optical signals of upstream data from the subscribers and converting the optical signals into electrical signals; a wavelength division multiplexer/demultiplexer for multiplexing/demultiplexing the optical signals; a broadband light source for broadcasting signals and downstream signals, the broadband light source being spectrum-sliced by the wavelength division multiplexer/demultiplexer and injected into light sources for downstream signals; and a broadband light source for upstream signals, the broadband light source being spectrum-sliced by the wavelength division multiplexer/demultiplexer and injected into light sources for upstream signals.

According to another aspect of the present invention, as can be seen in FIG. 14, there is provided a central office used in a wavelength division multiplexing passive optical network so as to simultaneously provide a broadcasting service and a communication service, the central office including a plurality of downstream optical transmitters for outputting optical signals for providing a plurality of subscribers with a data service; a plurality of upstream optical receivers for receiving optical signals of upstream data from the subscribers and converting the optical signals into electrical signals; a wavelength division multiplexer/demultiplexer for multiplexing/demultiplexing the optical signals; a broadband light source for broadcasting signals and downstream signals, the broadband light source being spectrum-sliced by the wavelength division multiplexer/demultiplexer and injected into light sources for downstream signals; an external modulator for optically modulating downstream optical signals into broadcasting signals, the downstream optical signals having been multiplexed by the wavelength division multiplexer/demultiplexer; and a broadband light source for upstream signals, the broadband light source being spectrum-sliced by the wavelength division multiplexer/demultiplexer and injected into light sources for upstream signals.

According to another aspect of the present invention, as can be seen in FIG. 15, there is provided a central office used in a wavelength division multiplexing passive optical network so as to simultaneously provide a broadcasting service and a communication service, the central office including a plurality of downstream optical transmitters for outputting optical signals for providing a plurality of subscribers with a data service; a plurality of upstream optical receivers for receiving optical signals of upstream data from the subscribers and converting the optical signals into electrical signals; a wavelength division multiplexer/demultiplexer for multiplexing/demultiplexing the optical signals; a broadband light source for downstream signals, the broadband light source being spectrum-sliced by the wavelength division multiplexer/demultiplexer and injected into light sources for downstream signals; a broadband light source for broadcasting signals and upstream signals, the broadband light source being spectrum-sliced by the wavelength division multiplexer/demultiplexer and injected into light sources for upstream signals; and a modulator for optically modulating the broadband light source for broadcasting signals and upstream signals into broadcasting signals.

BRIEF DESCRIPTION OF THE DRAWINGS

The foregoing and other objects, features and advantages of the present invention will become more apparent from the following detailed description when taken in conjunction with the accompanying drawings in which:

FIG. 16 shows an SNR based on an OMI when RIN=−105.8 dB/Hz and there are 25 channels according to the prior art;

FIG. 17 shows an SNR required by a digital data format according to the prior art; and FIG. 18 shows an SNR based on an OMI when RIN=−135 dB/Hz and there are 80 channels according to the present invention.

BEST MODE FOR CARRYING OUT THE INVENTION

Reference will now be made in detail to the preferred embodiments of the present invention.

Figure 8:
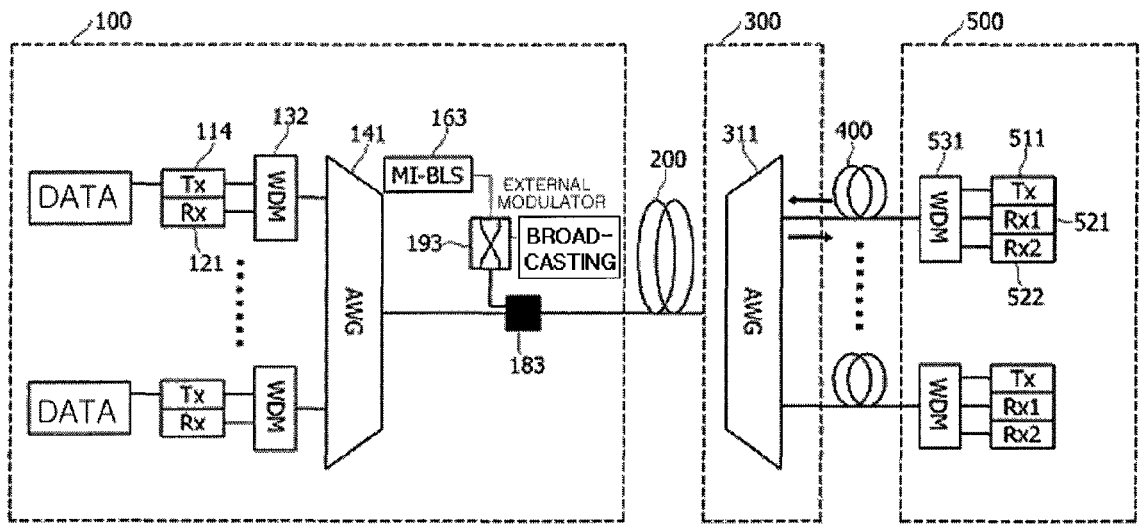
FIG. 8 shows a WDM-PON adapted to modulate a BLS by an external modulator and transmit broadcasting signals according to the present invention.

FIG. 8 shows a WDM-PON adapted to modulate a BLS, which uses mutually injected F-P LDs, by an external modulator and transmit broadcasting signals according to the present invention. Referring to FIG. 8, the WDM-PON adapted to simultaneously provide broadcasting and communication services according to the present invention includes a CO 100, a remote node (hereinafter, referred to as RN) 300, and ONTs 500.

The CO 100 includes a plurality of downstream optical transmitters 114 for providing downstream data signals; a plurality of upstream optical receivers 121 for converting upstream optical signals into electrical signals; a plurality of WDM filters 132 for combining or separating transmitted and received optical signals according to the wavelength; an AWG 141 for simultaneously conducting wavelength division multiplexing and demultiplexing functions; a BLS 163 using mutually injecting F-P LDs, which output optical signals for providing a plurality of subscribers with a broadcasting service; an external modulator 193 for optically modulating the BLS into broadcasting signals; and a WDM filter 183 for coupling multiplexed downstream optical signals to optical signals, which have been modulated into broadcasting signals by the external modulator.

The RN 300 includes an AWG 311.

The ONT 500 includes an upstream optical transmitter 511 for transmitting upstream data from each subscriber; a first optical receiver 521 for converting the optical signals of the broadcasting service, which has been transmitted by the BLS 163 using mutually injected F-P LDs, into electrical signals, a second optical receiver 522 for converting the optical signals of the downstream data, which has been transmitted by the downstream optical transmitter 114, into electrical signals; and a WDM filter 531 for combining or separating transmitted and received optical signals according to the wavelength.

After the downstream optical transmitters 114 transmit optical signals of downstream data, the signals are multiplexed by the AWG 141 and combined with optical signals for broadcasting by the WDM filter 183. After passing through an optical fiber 200, the multiplexed optical signals of downstream data and broadcasting are demultiplexed by the AWG 311 and pass through an optical fiber 400. The demultiplexed downstream optical signals are separated into optical signals of data and those of broadcasting by WDM filter 531. The optical signals of broadcasting are transmitted to the first optical receiver, and the optical signals of downstream data are transmitted to the second optical receiver. The upstream optical signals from the ONTs 500 are multiplexed as they pass through the AWG 311. After passing through the optical fiber 200, the upstream optical signals are demultiplexed by the AWG 141. The demultiplexed upstream optical signals are transmitted to the upstream optical receiver 121 via the WDM filter 132.

Figure 9:
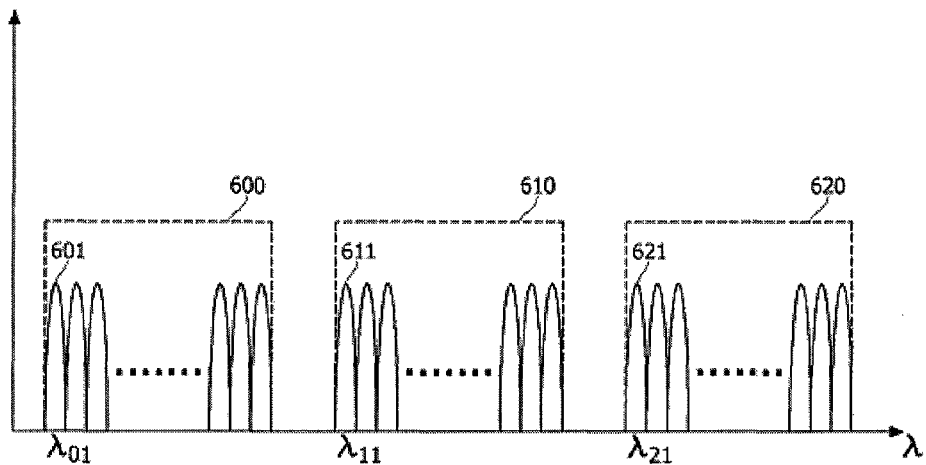
FIG. 9 shows the periodic characteristics of an AWG according to the prior art.

Since the optical signals of downstream data and the optical signals of broadcasting have different wavelength bands, they make use of the periodic properties of the AWGs so as to share them. FIG. 9 shows the output characteristics of an AWG. The AWG has periodic properties as is clear from first, second, and third wavelength bands 600, 610, and 620. Therefore, the first wavelength 601, 611, and 621 of each wavelength band passes through the first output port of the AWG. This means that, by using the optical signals of data as the first wavelength band and the optical signals of broadcasting as another wavelength band, the AWG can be shared.

The light source for transmitting upstream and downstream data may be a distributed feedback laser diode (hereinafter, referred to as DFB-LD) or a wavelength-locked F-P LD as proposed by Registered Korean Patent No. 325,687 (Feb. 8, 2002), entitled "A low-cost WDM source with an incoherent light injected Fabry-Perot semiconductor laser diode."

Figure 10:
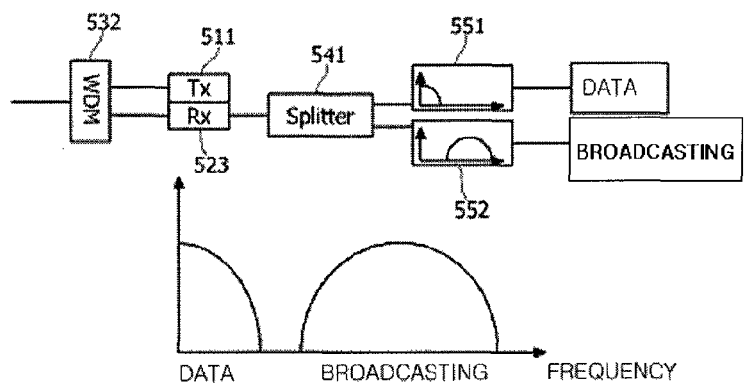
FIG. 10 shows a construction for separating a broadcasting signal from a downstream data signal by using an optical receiver according to the present invention.

Although it has been assumed in FIG. 8 that two downstream optical receivers are used, a single optical receiver may be used as shown in FIG. 10. In this case, optical signals of broadcasting and optical signals of downstream data are converted into electrical signals by an optical receiver 523 and separated from each other by an RF splitter 541 and electrical filters 551 and 552, for example.

Figure 11:
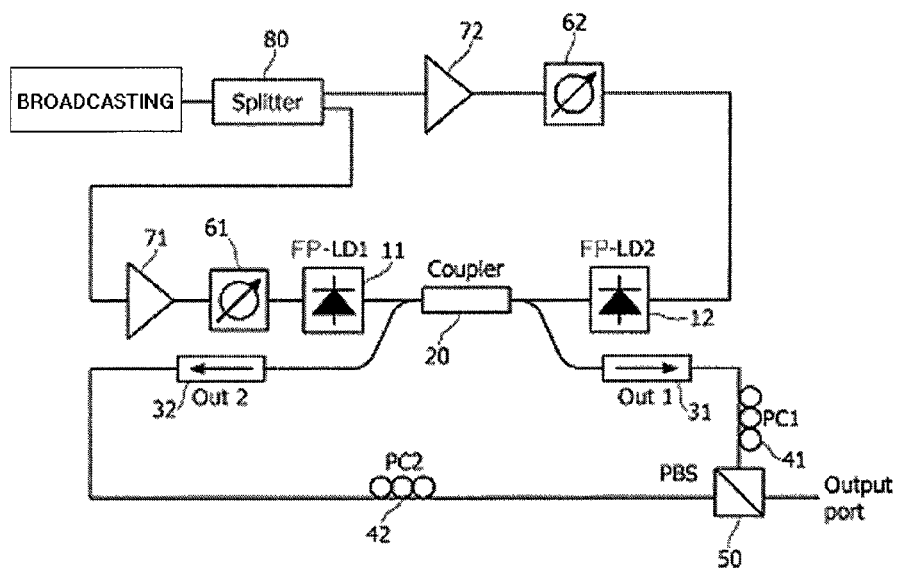
FIG. 11 shows a construction for directly modulating a BLS, which uses mutually injected P-F LDs according to the present invention.

FIG. 11 is a block diagram showing a system for directly modulating a BLS, which uses mutually injected F-P LDs, according to the present invention. Instead of using the external modulator 193 shown in FIG. 8, broadcasting signals can be transmitted by directly modulating a BLS 163, which uses mutually injected F-P LDs. The broadcasting signals are divided into two groups by an RF splitter 80. The first group of signals is transmitted to an F-P LD1 11 via a first RF amplifier 71 and a first phase adjuster 61, and the second group to an F-P LD2 12 via a second RF amplifier 72 and a second phase adjuster 62. By regulating the amplitude and phase of electric signals transmitted to both F-P LDs 11 and 12, it is possible to directly modulate the BLS, which uses mutually injected F-P LDs, into broadcasting signals.

Figure 12:
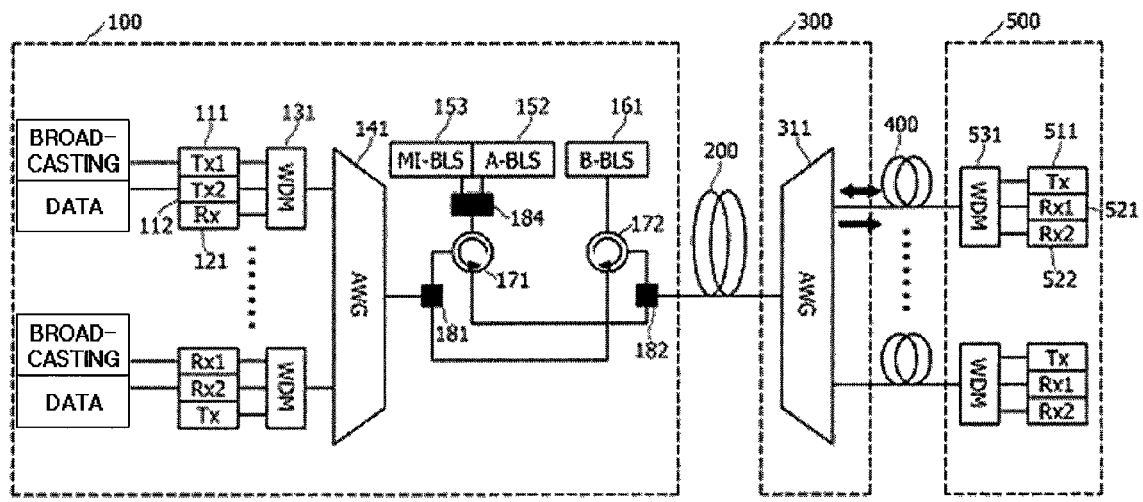
FIG. 12 shows a WDM-PON adapted to transmit data and broadcasting signals by respective optical transmitters according to the present invention.

FIG. 12 shows a WDM-PON adapted to transmit data and broadcasting signals by respective optical transmitters according to the present invention. This construction is applicable to wavelength-locked F-P LDs. Referring to FIG. 12, the WDM-PON for simultaneously providing broadcasting and communication services according to the present invention includes a CO 100, an RN 300, and ONTs 500.

The CO 100 includes a plurality of first downstream optical transmitters 111 for transmitting broadcasting signals; a plurality of second downstream optical transmitters 112 for transmitting downstream data signals; a plurality of upstream optical receivers 121; a plurality of WDM filters 131; an AWG 141; a BLS 153 which is injected into light sources for broadcasting signals and which uses mutually injected F-P LDs; an A-band BLS 152 injected into light sources for downstream data signals; a B-band BLS 161 injected into light sources for upstream data signals; and two optical circulators 171 and 172 and three WDM filters 181, 182, and 184 for coupling a number of BLSs.

The RN 300 includes an AWG 311.

The ONTs 500 include a plurality of upstream optical transmitters 511, a plurality of first optical receivers 521 for converting optical signals of a broadcasting service into electrical signals, and a plurality of second optical receivers 522 for converting optical signals of a downstream data service into electrical signals.

After passing through the WDM filter 184, the optical circulator 171, and the WDM filter 181, the A-band BLS 152 is spectrally sliced by the AWG 141. The spectrally sliced optical signals pass through the WDM filter 131 and are injected into the second optical transmitters 112 for downstream data signals. Similarly, the BLS 153, which uses mutually injected F-P LDs and which has a wavelength band different from A-band and B-bands, is injected into the first optical transmitters 111 for broadcasting signals via the same path. Optical signals outputted by the first optical transmitters 111 for broadcasting signals are combined with those outputted by the second optical transmitters 121 for downstream data signals at the WDM filter 131. Resulting optical signals of a number of channels are multiplexed as they pass through the AWG 141. Then, the signals successively pass through the WDM filter 181, the optical circulator 171, the WDM filter 182, and an optical fiber 200. Optical signals are demultiplexed as they pass through the AWG 311. Then, the signals pass through an optical fiber 400 and are divided into broadcasting signals and optical signals for downstream data by a WDM filter 531. Both kinds of signals are transmitted to the first and second optical receivers 521 and 522, respectively, and are converted into electrical signals.

After successively passing through the optical circulator 172, the WDM filter 182, and the optical fiber 200, the B-band BLS 161 is spectrally sliced by the AWG 311. The spectrally sliced optical signals pass through the optical fiber 400 and the WDM filter 531 and are injected into the upstream optical transmitters 511. Upstream optical signals outputted by the upstream optical transmitters 511 pass through the WDM filter 531 and the optical fiber 400 and are multiplexed by the AWG 311. The multiplexed upstream optical signals successively pass through the optical fiber 200, the WDM filter 182, the optical circulator 172, and the WDM filter 181. The optical signals are demultiplexed by the AWG 141 and are transmitted to the upstream optical receives 121 via the WDM filters 131.

Figure 1:
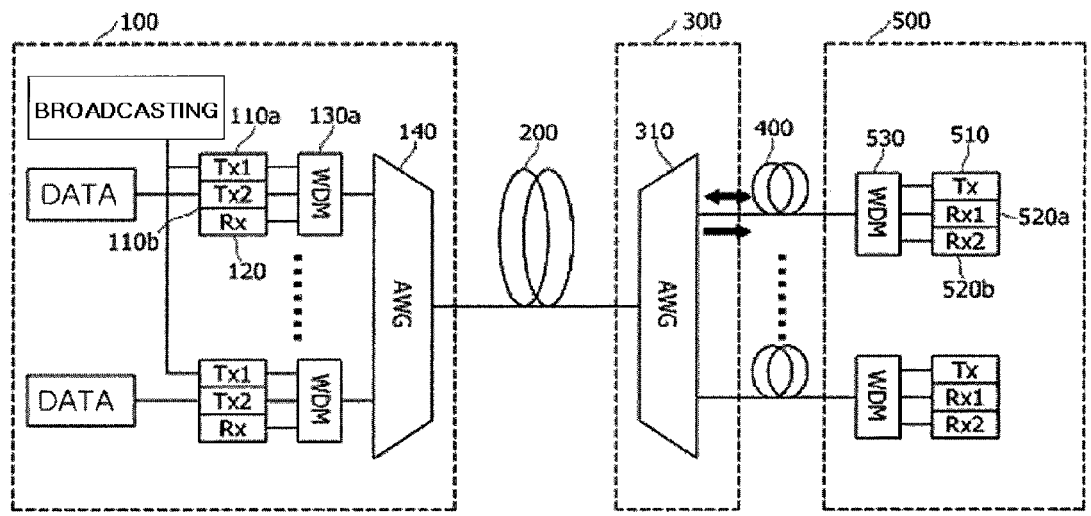
FIG. 1 shows a first example of a WDM-PON adapted to simultaneously transmit broadcasting and communication services according to the prior art.
Figure 2:
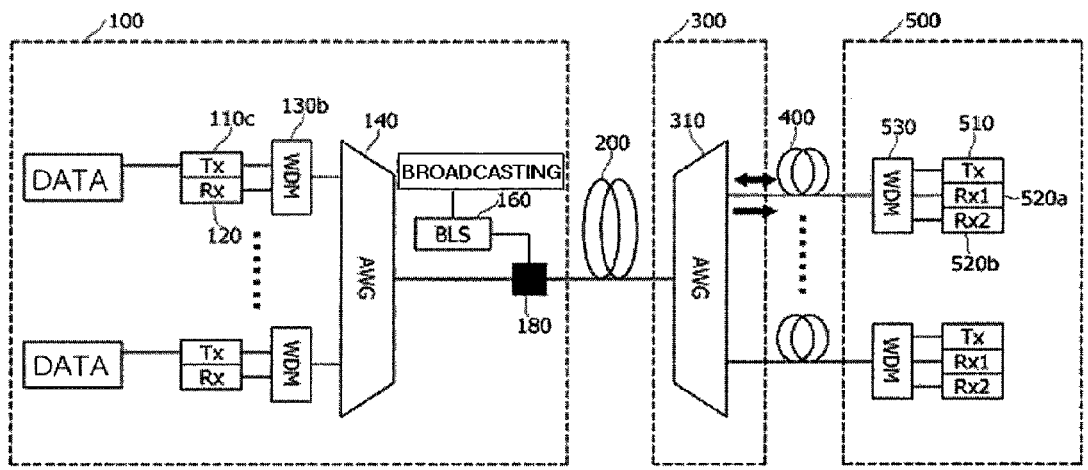
FIG. 2 shows a second example of a WDM-PON adapted to simultaneously transmit broadcasting and communication services according to the prior art.
Figure 3:
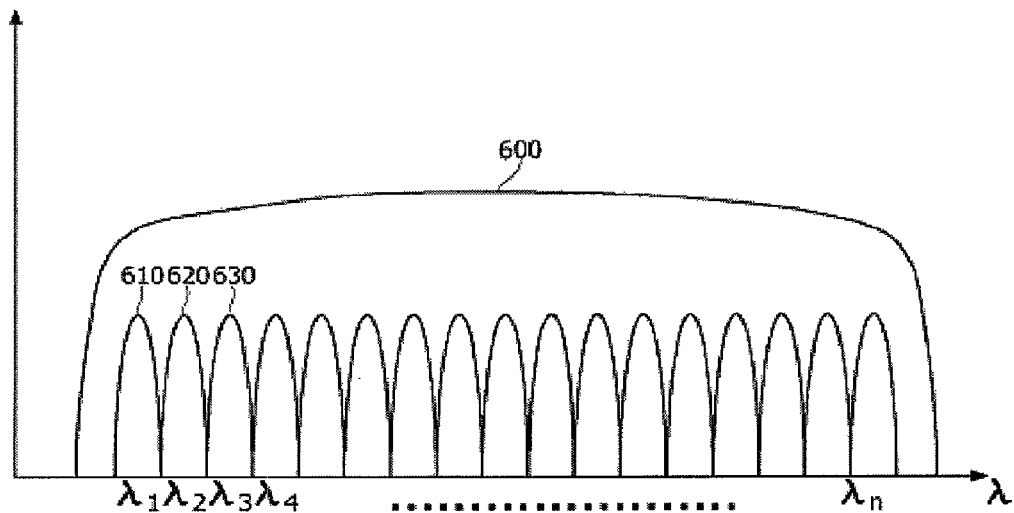
FIG. 3 shows the spectrums of a BLS before and after it passes through an AWG according to the prior art.
Figure 4:
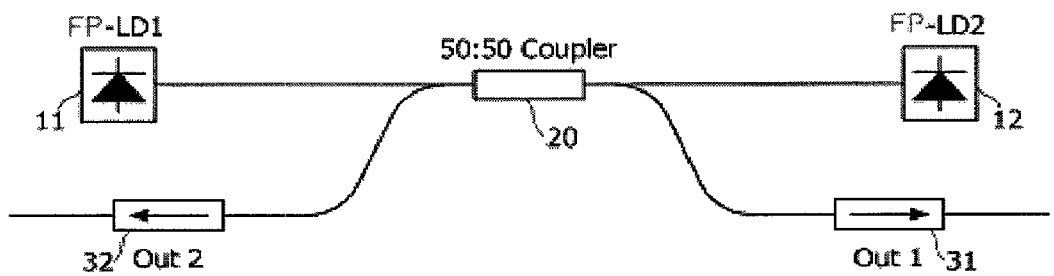
FIG. 4 shows a BLS depending on polarization using mutually injected F-P LDs according to the prior art.
Figure 5:
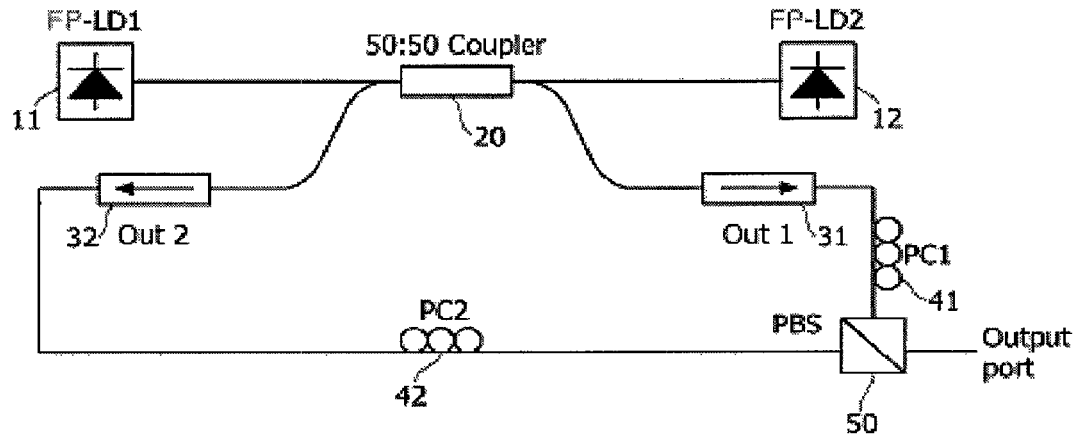
FIG. 5 shows a BLS not depending on polarization using mutually injected F-P LDs according to the prior art.
Figure 6:
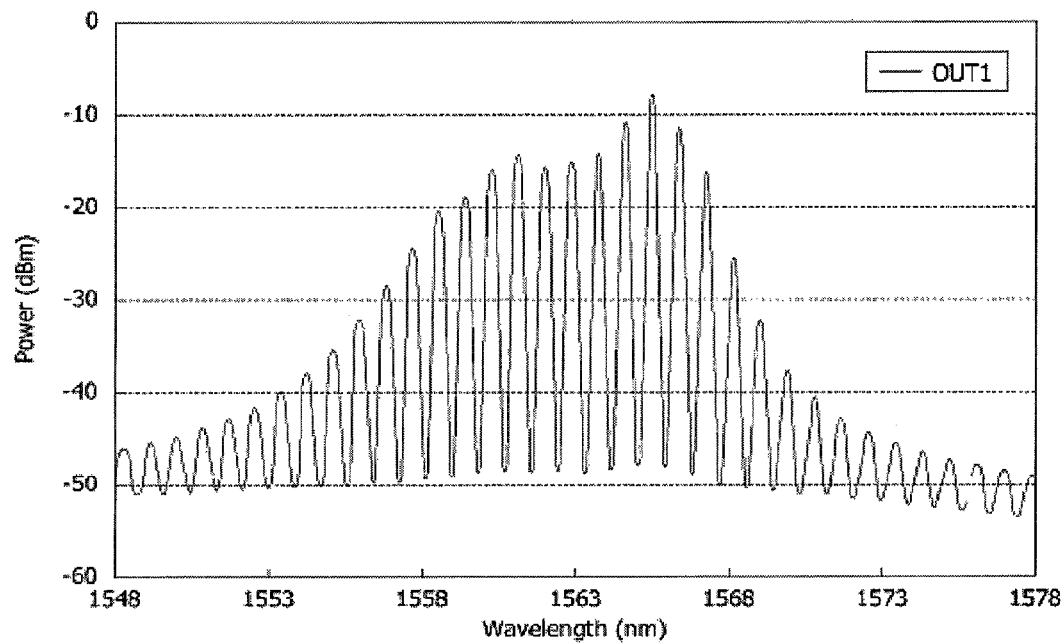
FIG. 6 shows an output spectrum of a BLS using mutually injected F-P LDs according to the prior art.
Figure 7:
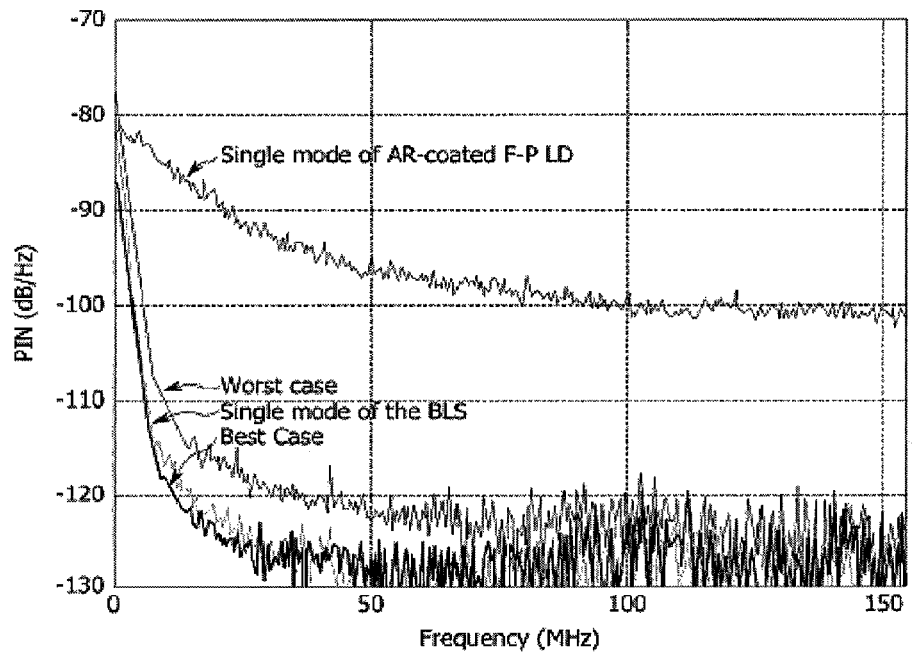
FIG. 7 shows noise characteristics of a BLS using mutually injected F-P LDs according to the prior art.

As such, the WDM-PON shown in FIG. 12 employs a BLS using mutually injected F-P LDs and injects the BLS into light sources for downstream broadcasting signals. Therefore, the WDM-PON is suitable for a case in which the light source for downstream signals must have very low noise, as shown in FIG. 7, so as to simultaneously transmit data and broadcasting signals by using it.

Figure 13:
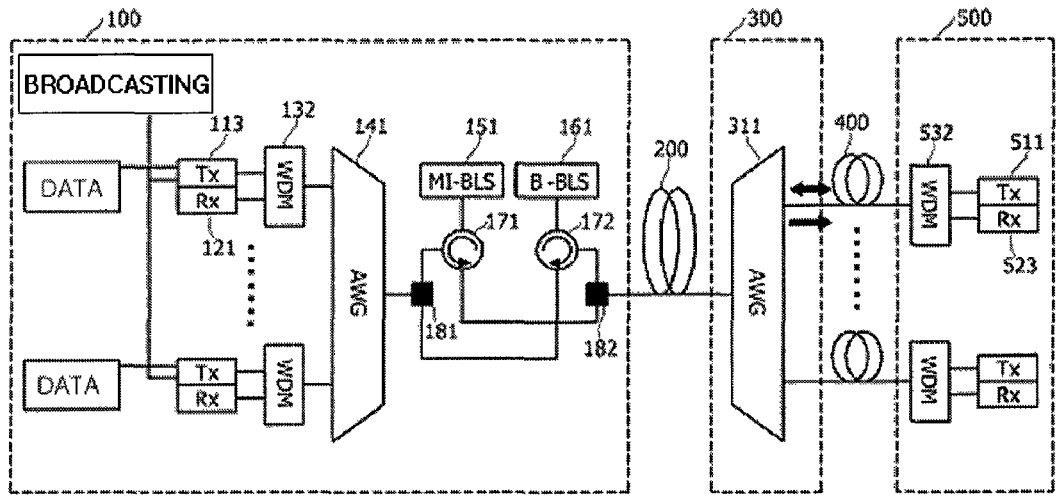
FIG. 13 shows a WDM-PON adapted to transmit data and broadcasting signals by a single downstream optical transmitter according to the present invention.

FIG. 13 shows a WDM-PON adapted to transmit data and broadcasting signals by a single downstream optical transmitter according to the present invention. This construction is applicable to wavelength-locked F-P LDs. Referring to FIG. 13, the WDM-PON for simultaneously providing broadcasting and communication services according to the present invention includes a Co 100, an RN 300, and ONTs 500.

The CO 100 includes a plurality of downstream optical transmitters 113 for simultaneously transmitting downstream data signals and broadcasting signals; a plurality of upstream optical receivers 121; a plurality of WDM filters 132; an AWG 141; an A-band BLS 151 which is injected into light sources for downstream signals and which uses mutually injected F-P LDs; a B-band BLS 161 injected into light sources for upstream signals; and two optical circulators 171 and 172 and two WDM filters 181 and 182 for coupling the A-band and B-band BLSs to each other.

The RN 300 includes an AWG 311.

The ONTs 500 include a plurality of upstream optical transmitters 511 and a plurality of downstream optical receivers 523 for converting optical signals of a broadcasting service and those of a downstream data service into electrical signals.

According to the above-described construction, a wavelength-locked light source is used as both a light source for downstream data and that for broadcasting signals. Upstream and downstream optical signals propagate through the same path as in the case of the construction shown in FIG. 12. In order to simultaneously apply broadcasting signals and data signals to a light source, the frequency band of the broadcasting signals must be different from that of the data signals.

Figure 14:
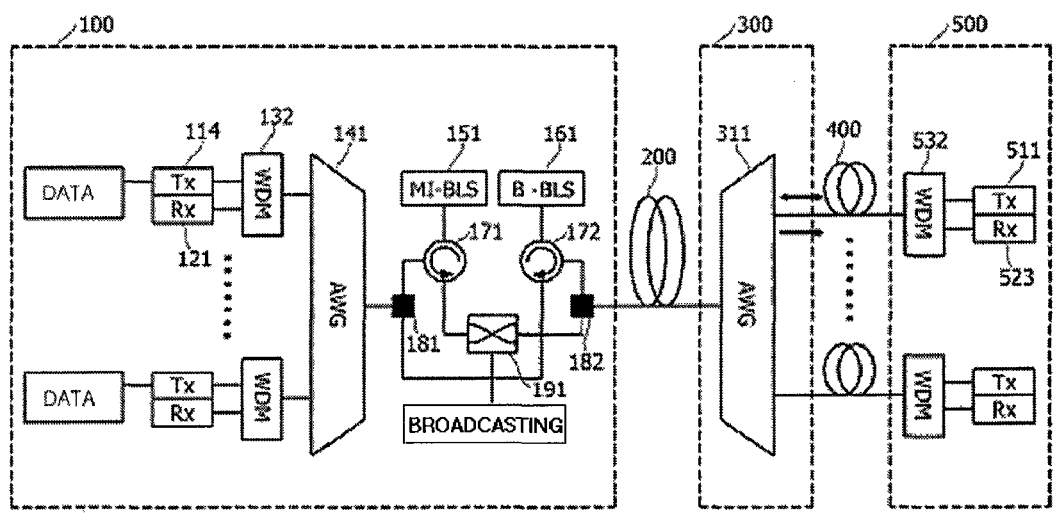
FIG. 14 shows a WDM-PON adapted to externally modulate multiplexed optical signals of downstream data into broadcasting signals and transmit them according to the present invention.

FIG. 14 shows a WDM-PON adapted to add multiplexed downstream optical signals to broadcasting signals by an external modulator and transmit them according to the present invention. This construction is applicable to wavelength-locked F-P LDs. Referring to FIG. 14, the WDM-PON for simultaneously providing broadcasting and communication services according to the present invention includes a CO 100, an RN 300, and ONTs 500.

The construction shown in FIG. 14 is similar to that shown in FIG. 13, except that the plurality of downstream optical transmitters 113 (FIG. 13) for simultaneously transmitting broadcasting and data are replaced with a plurality of optical transmitters 114 for transmitting data only. In addition, multiplexed downstream optical signals are optically modulated by an external modulator 191 so as to transmit broadcasting signals. Optical signals propagate through the same path as in the case of the construction shown in FIG. 13, except for the optical modulator 191.

Figure 15:
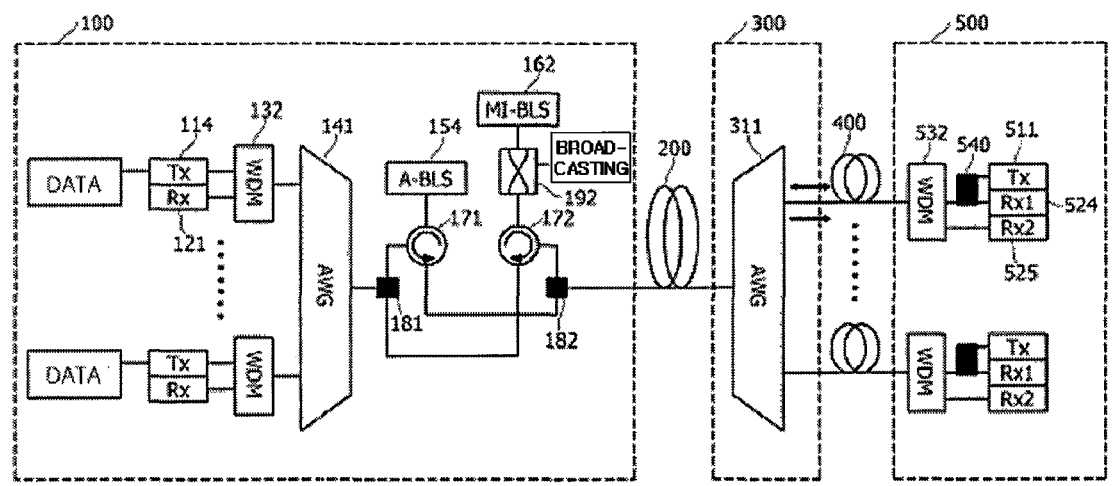
FIG. 15 shows a WDM-PON adapted to modulate a BLS, which is injected into an upstream transmitter, by an external modulator and transmit broadcasting signals according to the present invention.

FIG. 15 shows a WDM-PON adapted to modulate a BLS, which is injected into an upstream transmitter, by an external modulator and transmit broadcasting signals according to the present invention. This construction is applicable to wavelength-locked F-P LDs. Referring to FIG. 15, the WDM-PON for simultaneously providing broadcasting and communication services according to the present invention includes a CO 100, an RN 300, and ONTs 500.

According to the construction shown in FIG. 13 or 14, a BLS using mutually injected F-P LDs is injected into downstream light sources. In the case of FIG. 15, a BLS using mutually injected F-P LDs is injected into upstream light sources. A plurality of downstream optical transmitters 114 are used to transmit data only. A BLS 162, which uses mutually injected F-P LDs and which is injected into a light source for upstream signals, is optically modulated into broadcasting signals by an external modulator 192. After the optical modulation, broadcasting signals pass through an optical circulator 172, a WDM filter 182, and an optical fiber 200 and are demultiplexed by an AWG 311. The demultiplexed optical signals pass through optical fibers 400 and WDM filters 532. The optical signals are divided by optical splitters 540 into two groups of signals, which are transmitted to upstream optical transmitters 511 and first optical receivers 524, respectively. The optical transmitters 114 transmit optical signals of downstream data to second optical receivers 525, which convert them into electrical signals. The optical splitters 540 may be couplers, for example. Instead of using the external modulator 192, the direction modulation mode shown in FIG. 11 may be adopted.

The following features are common to the constructions shown in FIGS. 8 to 15.

1) The BLS using mutually injected F-P LDs may employ F-P LDs having anti-reflective coating.

2) As the light source for upstream or downstream signals, a wavelength-locked F-P LD or an SOA (Semiconductor Optical Amplifier), into which a BLS injected from the outside, may be used.

3) An AWG or thin film filters may be used as the wavelength division multiplexer/demultiplexer.

Although the above-mentioned BLS uses mutually injected F-P LDs, an LED or EDFA may also be used.

Even when a light source exhibits perfect linearity, the number of channels available for transmission is essentially limited by RIN and clipping. Particularly, the number of channels limited by clipping is inversely proportional to an optical modulation index (hereinafter, referred to as OMI) if there are less channels, and to the square of the OMI if there are more channels.

FIG. 16 shows an SNR (Signal to Noise Ratio) based on an OMI when RIN=−105.8 dB/Hz and there are 25 channels according to the prior art. It is assumed that the receiver has a bandwidth of 6 MHz. FIG. 17 shows an SNR required by a digital data format. In this case, the system requires a BER of $10^{-9}$. The SNR must be increased by 1.4 dB for a BER of $10^{-12}$ and by 2.4 dB for a BER of $10^{-15}$. In the case of FIG. 16, the SNR is higher than 15.6 dB when the OMI is 12.6%. This enables QPSK transmission. In this regard, 16QAM enables transmission via five channels, 64QAM via two channels, and 256QAM via one channel.

As such, the inventive method employs a BLS which uses mutually injected F-P LDs and which has an RIN value lower than that of conventional BLSs, so that broadcasting signals can be transmitted via more channels. In addition, signals can be transmitted in a data format requiring a high SNR, such as QAM (Quadrature Amplitude Modulation).

FIG. 18 shows an SNR based on an OMI determined by RIN and clipping. In this case, the BLS using mutually injected F-P LDs has particulars of RIN=−135 dB/Hz and a channel number of 80. The SNR is at least 36 dB when the OMI is 4.3%. This enables 256QAM 80-channel signal transmission. When similarly applied to 64QAM, 16QAM, and QPSK, transmission via at least 130 channels is possible. As such, when a WDM-PON uses a BLS using mutually injected F-P LDs so as to transmit broadcasting signals, a single light is enough to transmit broadcasting signals to a number of subscribers in a data format having more channels and a higher SNR than conventional BLSs.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

INDUSTRIAL APPLICABILITY

As can be seen from the foregoing, the WDM-PON for simultaneously providing broadcasting and communication services according to the present invention can save the cost for separately installing, maintaining, and managing a data service network and a broadcasting service network. Particularly, the WDM-PON uses a BLS, which using mutually injected F-P LDs and which has low RIN characteristics, so that signals can be transmitted in a data format having more channels and a higher SNR than conventional BLSs. In addition, the BLS using mutually injected F-P LDs is compact and inexpensive enough to implement an economical WDM-PON system capable of simultaneously providing broadcasting and communication services.

The invention claimed is:

1. A central office used in a wavelength division multiplexing passive optical network, which provides a broadcasting service and a communication service simultaneously, the central office comprising:
   a plurality of downstream optical transmitters for outputting first optical signals for providing a plurality of subscribers with a data service;
   a plurality of upstream optical receivers for receiving optical signals of upstream data from the subscribers and converting the optical signals into electrical signals;
   a wavelength division multiplexer/demultiplexer for multiplexing/demultiplexing the optical signals;
   a broadband light source for broadcasting signals comprising mutually injected Fabry-Perot laser diodes which are coupled to the wavelength division multiplexer/demultiplexer to output optical signals for providing the subscribers with a broadcasting service; and
   a modulator coupled to the mutually injected Fabry-Perot laser diodes for modulating the optical signals of the mutually injected Fabry-Perot laser diodes into broadcasting signals.

2. The central office as claimed in claim 1 wherein the Fabry-Perot laser diodes used by the broadband light source have anti-reflective coating.

3. The central office as claimed in claim 1, further comprising light sources for the downstream optical transmitters, the light sources for the downstream optical transmitters being a wavelength-locked Fabry-Perot laser diode or a semiconductor optical amplifier, a broadband light source having been injected into the semiconductor optical amplifier from outside.

4. The central office as claimed in claim 1, further comprising light sources for the downstream optical transmitters, the light sources for the downstream optical transmitters being a distributed feedback laser diode.

5. The central office as claimed in claim 1, wherein the wavelength division multiplexer/demultiplexer is an arrayed waveguide grating or thin film filters.

6. The central office as claimed in claim 1, wherein the modulator for optically modulating the broadband light source into broadcasting signals is an external modulator or a modulator adopting a direct modulation method.

* * * * *